United States Patent
Song et al.

(10) Patent No.: US 9,621,277 B2
(45) Date of Patent: Apr. 11, 2017

(54) PRE-DISTORTION OF AN OPTICAL SIGNAL WITH FREQUENCY DIVISION MULTIPLEXED SUB-CARRIERS

(71) Applicant: Orange, Paris (FR)

(72) Inventors: Mengdi Song, Lannion (FR); Erwan Pincemin, Gommenec'h (FR)

(73) Assignee: ORANGE, Paris (FR)

( * ) Notice: Subject to any disclaimer, the term of this patent is extended or adjusted under 35 U.S.C. 154(b) by 25 days.

(21) Appl. No.: 14/591,672

(22) Filed: Jan. 7, 2015

(65) Prior Publication Data

US 2015/0318931 A1  Nov. 5, 2015

(30) Foreign Application Priority Data

Jan. 7, 2014 (FR) ..................... 14 50071

(51) Int. Cl.
*H04B 10/58* (2013.01)
*H04J 14/02* (2006.01)
(Continued)

(52) U.S. Cl.
CPC .............. *H04B 10/58* (2013.01); *H04J 14/02* (2013.01); *H04J 14/0221* (2013.01);
(Continued)

(58) Field of Classification Search
CPC ........... H04L 27/2634; H04L 2697/367; H04L 2697/368; H04J 14/02; H04J 14/0221; H04J 14/0298
(Continued)

(56) References Cited

U.S. PATENT DOCUMENTS

2006/0116143 A1* 6/2006 Kikushima ............ H04B 10/58
                                                           455/501
2007/0206954 A1  9/2007 Fishman et al.
(Continued)

FOREIGN PATENT DOCUMENTS

FR    2906660 A1    4/2008

OTHER PUBLICATIONS

French Search Report and Written Opinion dated Sep. 3, 2014 for corresponding French Application No. 1450071, filed Jan. 7, 2014.
(Continued)

*Primary Examiner* — David Payne
*Assistant Examiner* — Omar S Ismail
(74) *Attorney, Agent, or Firm* — David D. Brush; Westman Champlin & Koehler, P.A.

(57) ABSTRACT

A method is provided for pre-distorting an optical signal, intended to be transmitted over an optical transmission line and including a plurality of frequency division multiplexed optical sub-carriers. The optical signal is obtained from an optical conversion of an electrical signal including a plurality of frequency division multiplexed sub-carriers. This method includes obtaining a plurality of corrective factors, corresponding to the electrical sub-carriers, as a function of a plurality of values, determined for the optical sub-carriers, of a first parameter dependent on the power of the sub-carriers, and application of the corrective factors to the amplitudes of the corresponding electrical sub-carriers, so as to equalize, at the output of the optical transmission line, the values of the first parameter for the sub-carriers of the optical signal.

12 Claims, 4 Drawing Sheets

(51) Int. Cl.
*H04L 27/26* (2006.01)
*H04L 27/36* (2006.01)

(52) U.S. Cl.
CPC ...... *H04J 14/0298* (2013.01); *H04L 27/2634* (2013.01); *H04L 27/2697* (2013.01); *H04L 27/368* (2013.01)

(58) Field of Classification Search
USPC .......................................................... 398/76
See application file for complete search history.

(56) References Cited

U.S. PATENT DOCUMENTS

| | | | | |
|---|---|---|---|---|
| 2010/0046958 | A1* | 2/2010 | Awadalla | H04B 10/25137 398/149 |
| 2011/0103794 | A1* | 5/2011 | Gottwald | H04L 27/2602 398/58 |
| 2011/0158642 | A1* | 6/2011 | Barnard | H04B 10/572 398/25 |
| 2012/0141134 | A1 | 6/2012 | Hauske | |

OTHER PUBLICATIONS

Sugihara T. et al., "43 Bg/s DQPSK Pre-Equalization Employing 6-bit, 73GS/s DAC Integrated LSI for Cascaded ROADM Filtering" Optical Fiber Communication (OFC), Collocated National Fiber Optic Engineers Conference, 2010 Conference on (OFC/NFOEC), IEEE, Piscataway, NJ, USA, Mar. 21, 2010 (Mar. 21, 2010), pp. 1-3, XP031677222.

Uto K. et al., "An Experimental Stufd of Nonlinear Effects on 43 Gb/s Electronic Pre-Equalization Transmission", Optical Fiber Communication Conference and Exposition and the National Fiber Optic Engineers Conference (OFC/NFOEC), 2013, IEEE, Mar. 17, 2013 (Mar. 17, 2013), pp. 1-3, XP032426712.

English translation of the French Written Opinion dated Sep. 3, 2014 for corresponding French Application No. 1450071, filed Jan. 7, 2014.

* cited by examiner

PRE-DISTORTION OF AN OPTICAL SIGNAL WITH FREQUENCY DIVISION MULTIPLEXED SUB-CARRIERS

CROSS-REFERENCE TO RELATED APPLICATIONS

This Application claimed priority from and the benefit of French Patent Application No. 14 50071, filed Jan. 7, 2014, the content of which is incorporated herein by reference in its entirety.

FIELD OF THE DISCLOSURE

The present invention relates to the field of the transmission of optical signals, and more particularly, the field of the transmission of optical signals with frequency division multiplexed sub-carriers.

BACKGROUND OF THE DISCLOSURE

The optical transmission systems currently on the market make use of the so-called "wavelength division multiplexing" (WDM) technology that allows transmission bit rates of 10 Gbps, 40 Gbps, even 100 Gbps, by using the 50 GHz ITU grid, in other words, a grid in which the spacing between two WDM optical channels is 50 GHz (or 0.4 nm).

The long haul optical transport networks have progressively adopted a meshed architecture, through the implementation of reconfigurable wavelength optical add/drop multiplexers, also called ROADM. These ROADM multiplexers make it possible to transparently route the WDM channels without the need for costly optical/electrical/optical (OEO) regeneration operations.

With the rise in bit rate and the appearance of 400 Gbps and 1 Tbps "super-channels", it is becoming possible to optically disaggregate the constituent optical sub-bands of these "super-channels". As a result, a new so-called "orthogonal frequency division multiplexing" (OFDM) technology can be employed, within these very constituent sub-bands, this OFDM technology being more robust than the WDM technology compared to the chromatic and modal dispersions of polarisation, offering a rectangular spectrum that is more tolerant in optical filtering terms, while further allowing for the use of different modulations according to the sub-carriers.

With this in mind, a new grid has therefore been standardized by the ITU-T (standard G.694.1) in order to offer a framework for the implementation of these "super-channels". In this new grid, the sub-wavelengths (at the centre of the optical sub-bands) have to be aligned on a grid with a pitch of 6.25 GHz, whereas the granularity of the spectral slot is 12.5 GHz.

It follows that from the optical routing of the constituent optical sub-bands of "super-channels" within the future entail the use of ROADM multiplexers that are more selective and narrower than those currently used on the traditional WDM transmission systems, the spectral transfer function of these optical multiplexers having to be as rectangular as possible.

Now, the perfectly rectangular nature of the narrow spectral transfer function of the optical filters, in particular of the sub-band multiplexers, cannot be guaranteed. As a result, the cascading of a plurality of sub-band optical filters or multiplexers, for example in a cascade of ROADM multiplexers, necessarily degrades the initial form of the spectrum of the constituent OFDM sub-bands of a "super-channel" in the transmission of this "super-channel" through these filters.

FIGS. 1A and 1B thus illustrate the distortion created on the spectrum of an OFDM optical signal of 8 GHz bandwidth, here comprising 256 sub-carriers and suitable for acting as a constituent optical sub-band of a "super-channel" as discussed previously, these figures illustrating the spectrum of this OFDM signal respectively before and after a cascade of 5 sub-band dropping selective optical filters.

It can be seen that, although the initial spectrum is substantially flat in FIG. 1A, the difference in power between the sub-carriers in mid-spectrum and those at the spectrum edge is approximately 10 dB after passing through the optical filters, in FIG. 1B.

The performance in reception of such an OFDM optical signal is greatly degraded, in that the different constituent sub-bands of this OFDM signal then exhibit extremely variable bit error ratios (BER), the signal-to-noise ratio (SNR) between these different sub-carriers no longer being at all the same at the receiver of this OFDM signal.

SUMMARY

An aspect of the present disclosure relates to a method for pre-distorting an optical signal, intended to be transmitted over an optical transmission line and comprising a plurality of frequency division multiplexed optical sub-carriers, this optical signal being obtained from the optical conversion of an electrical signal comprising a plurality of frequency division multiplexed electrical sub-carriers, this method comprising the following steps:

obtaining a plurality of corrective factors corresponding to the electrical sub-carriers, as a function of a plurality of values, determined for the optical sub-carriers, of a first parameter dependent on the power of these sub-carriers; and application of the corrective factors to the amplitudes of the corresponding electrical sub-carriers, so as to equalize, at the output of the optical transmission line, the values of the first parameter for the sub-carriers of the optical signal.

By virtue of the use of these corrective factors in the electrical domain, the duly applied pre-distortion makes it possible to neutralize the deformation of the spectrum of the multi-carrier signal in terms of power during transmission thereof in the optical domain and therefore to limit the impact on a multi-carrier signal of the insertion of optical components such as ROADM optical multiplexers into an optical transmission line.

According to one embodiment, the method further comprises a preliminary configuration step during which the values of the first parameter are measured at the output of the optical transmission line and the corrective factors are calculated as a function of the measured values of the first parameter before being stored, which makes it possible to obtain corrective factors specifically matched to the transmission line over which the optical signal is intended to be transmitted.

According to another embodiment, the method further comprises a preliminary configuration step during which several sets of corrective factors are stored in association with several possible optical transmission line configurations, the set of corrective factors to be applied being obtained by recovering, from among the stored sets, a set associated with a configuration corresponding to the configuration of the optical transmission line, which makes it possible to configure the corrective factors in advance.

In a particular embodiment that makes it possible to specifically neutralize the impact of the components of the optical line on the bit error ratios associated with the different sub-carriers at the output of this optical line, the first parameter is the signal-to-noise ratio of an optical sub-carrier. In this embodiment, the corrective factor $\alpha_{A,i}$, corresponding to the ith sub-carrier of the electrical signal is advantageously calculated as follows:

$$\alpha_{A,i} = \sqrt{\frac{1}{SNR_i} \cdot \frac{N}{\sum_{i=1}^{N}\left(\frac{1}{SNR_i}\right)}}$$

in which $SNR_i$ is the signal-to-noise ratio of the ith optical sub-carrier at the output of the optical transmission line and N is the number of sub-carriers of the optical signal.

In another particular embodiment, the first parameter is the power of an optical sub-carrier, which allows for a simplified neutralization of the impact of the components of the optical line on the bit error ratios, without having to measure the particular noise powers of the sub-carriers at the optical line output. In this other embodiment, the corrective factor $\alpha_{A,i}$, corresponding to the ith sub-carrier of the electrical signal is advantageously calculated as follows:

$$\alpha_{A,i} = \sqrt{\frac{P_{SC,0}}{P_{SC,i}} \cdot \frac{N}{\sum_{i=1}^{N}\left(\frac{P_{SC,0}}{P_{SC,i}}\right)}}$$

in which $P_{SC,0}$ is the power at the output of the optical transmission line of a reference sub-carrier from among the sub-carriers of the optical signal, $P_{SC,1}$ is the power at the output of the optical transmission line of the ith sub-carrier of the optical signal and N is the number of sub-carriers of the optical signal.

Another aspect of the disclosure relates to a device for pre-distorting an electrical signal comprising a plurality of frequency division multiplexed sub-carriers, intended to be converted into an optical signal transmitted over an optical transmission line and comprising a plurality of frequency division multiplexed optical sub-carriers. This device is noteworthy in that it comprises processing means configured to:

obtain a plurality of corrective factors, corresponding to the electrical sub-carriers, as a function of a plurality of values, determined for the optical sub-carriers, of a first parameter dependent on the power of these sub-carriers; and apply the corrective factors to the amplitudes of the corresponding electrical sub-carriers, so as to equalize, at the output of said optical transmission line, the values of the first parameter for the sub-carriers of the optical signal.

This device advantageously comprises storage means suitable for storing at least one set of corrective factors, the processing means being arranged to access the storage means in order to recover the corrective factors to be applied to the respective amplitudes of the sub-carriers of the electrical signal, which allows for a preliminary configuration of corrective factors to be applied, during the pre-distortion in the electrical domain, before the pre-distortion device is installed upstream of the optical transmission line in which the signal is intended to be transmitted.

Another aspect of the present disclosure relates to an optical transmitter for transmitting, over an optical transmission line, an optical signal comprising a plurality of frequency division multiplexed optical sub-carriers is proposed, this transmitter comprising the above pre-distortion device and optical conversion means arranged to convert an electrical signal comprising a plurality of frequency division multiplexed electrical sub-carriers, generated by the pre-distortion device, into an optical signal comprising a plurality of frequency division multiplexed optical sub-carriers.

Yet another aspect of the present disclosure relates to an optical transmission system comprising at least one optical transmitter as mentioned above, suitable for transmitting an optical signal comprising a plurality of frequency division multiplexed optical sub-carriers, an optical transmission line, the input of which is connected to the output of said at least one optical transmitter, this optical transmission line comprising at least one optical device that has a spectral transfer function likely to affect the spectrum of said optical signal, and at least one optical receiver, the input of which is connected to the output of the optical transmission line. The optical device concerned can notably be a multiplexer of ROADM type, the spectral transfer function of which is not perfectly rectangular.

Another aspect of the present disclosure relates to a computer program comprising code instructions for the execution of the steps of the above pre-distortion method when this program is run by a processor. This program can use any programming language, and be in the form of source code, object code, or intermediate code between source code and object code, such as in a partially-complied or in any other desirable form.

Another aspect of the present disclosure relates to a computer-readable storage medium on which is stored a computer program as described above.

This information medium can be any entity or device capable of storing the program. For example, the medium can comprise a storage means, such as a ROM, for example a CD ROM or a microelectronic circuit ROM, or even a magnetic storage means or a hard disk. Also, the information medium can be a transmissible medium such as an electrical or optical signal, which can be routed via an electrical or optical cable, wirelessly or by other means. The program according to an exemplary embodiment can in particular be downloaded over a network of internet type. Alternatively, the information medium can be an integrated circuit in which the program is incorporated, the circuit being adapted to execute or to be used in the execution of the method concerned.

BRIEF DESCRIPTION OF THE DRAWINGS

Other features and advantages will become apparent on reading, in the following detailed description, about particular embodiments, given as nonlimiting examples, and from the attached figures in which, in addition to FIGS. 1A and 1B that have already been discussed.

DETAILED DESCRIPTION OF ILLUSTRATIVE EMBODIMENTS

Figure 1A:
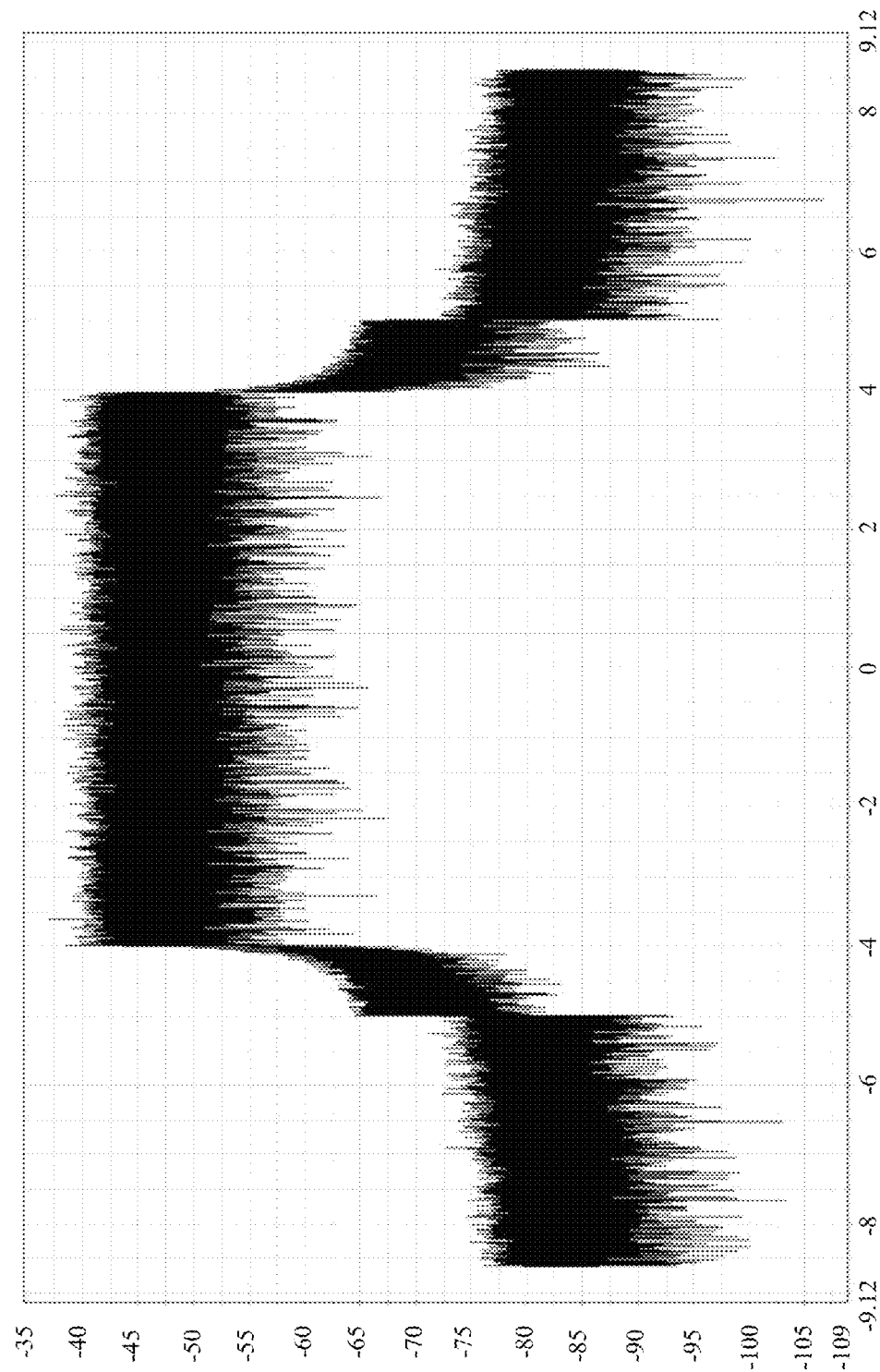
Figure 1B:
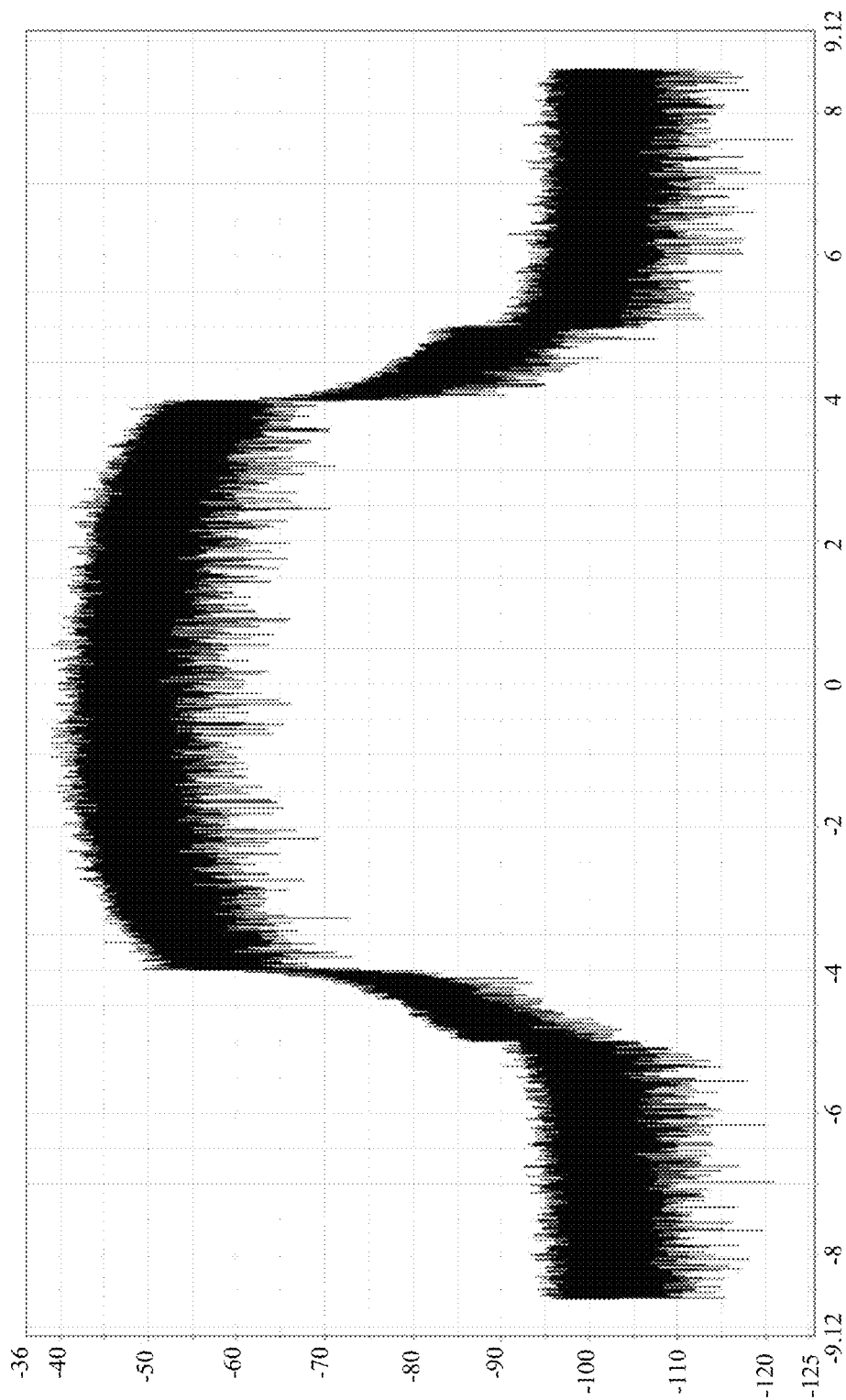
Figure 2:
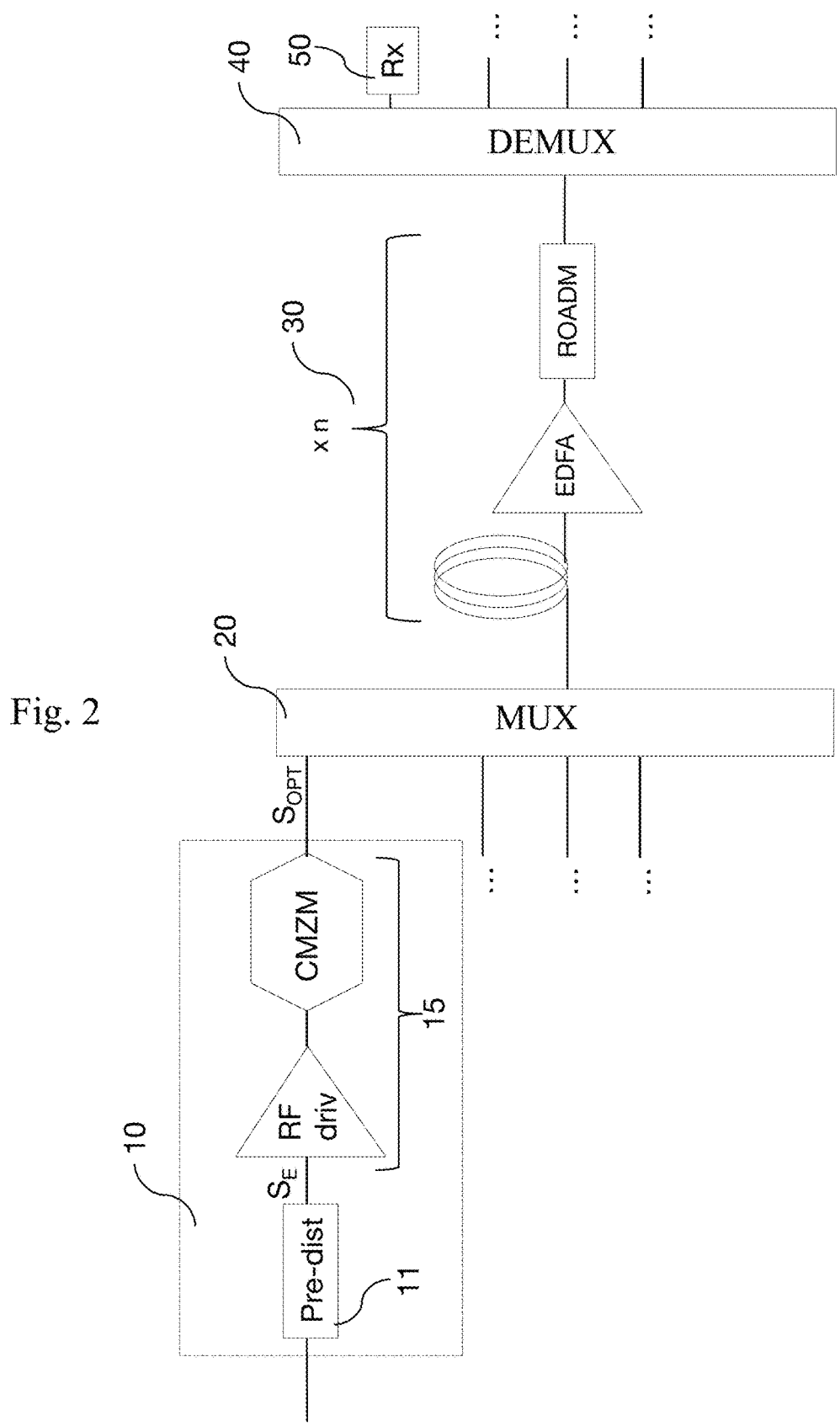
FIG. 2 illustrates an optical transmission system in which an embodiment of the present disclosure can be implemented.

Reference is first of all made to FIG. 2 which illustrates an optical transmission system in which an aspect of the present disclosure can be implemented.

This transmission system comprises optical transmitters (a single transmitter 10 being illustrated here, in a nonlimiting manner) connected, via an optical wavelength division multiplexer 20, to the input of an optical transmission line 30. The output of this optical transmission line 30 is connected to a plurality of optical receivers (just one receiver 50 being illustrated here, in a nonlimiting manner), via an optical wavelength division demultiplexer 40.

In such a system, each optical transmitter transmits an optical sub-band comprising N frequency division multiplexed sub-carriers (N being equal to $2^k$, k being an integer, for example N=128, 256, 512, . . . ), and the different optical sub-bands are wavelength division multiplexed in order to construct an optical signal of "super-channel" type and are thus transmitted over the line 30 before being wavelength division demultiplexed at the output to be directed to their respective optical receivers.

The optical transmission line 30 typically consists of an alternation of an optical fibre with various optical components having spectral transfer functions which are specific to them. FIG. 2 illustrates a particular case in which this line 30 comprises the repetition of n (n being an integer such that n≥1) similar sets (or "spans") consisting of an optical fibre (for example of SSMF type) followed by an optical amplifier (for example of EDFA type) which is in turn followed by a reconfigurable wavelength optical add/drop multiplexer ROADM. In other words, the transmission line 30 comprises n cascaded ROADM multiplexers, which exhibit a cumulative spectral transfer function likely to greatly affect the performance of an OFDM optical signal passing over this line 30, because of the imperfection of the rectangular nature of the spectral transfer functions of these multiplexers.

The optical transmitter 10 is, for its part, configured to transmit an OFDM optical signal, that is to say an optical signal (denoted $S_{OPT}$) made up of a plurality N of frequency division multiplexed optical sub-carriers, from an electrical signal $S_E$ which is itself made up of the same number N of frequency division multiplexed electrical sub-carriers. As already indicated, such an OFDM optical signal can notably correspond to a constituent optical sub-band of an optical signal of "super-channel" type as described previously.

More specifically, the transmitter 10 comprises electro-optical conversion means 15 capable of converting the electrical signal $S_E$ into an optical signal $S_{OPT}$, these means typically being implemented in the form of an electrical amplifier ("RF driver"), powered by the electrical signal $S_E$ so as to control an optical modulator (for example of C-MZM type) in order for the latter to modulate an optical signal generated by an optical source (not illustrated). The N optical sub-carriers of the optical signal $S_{OPT}$ are thus obtained from the electro-optical conversion of the N electrical sub-carriers of the electrical signal $S_E$.

In order to take account of the impact of the optical devices present on the line 30, notably of the multiplexers of ROADM type, the transmitter 10 further comprises a pre-distortion device 11, in the form of a module inserted upstream of the electro-optical conversion means 15, which acts on the electrical signal $S_E$ before the latter is converted into an optical signal $S_{opt}$. In other words, the signal processing that makes it possible to neutralize the effects of the multiplexers of ROADM type of the line 30 on the optical signal is performed in the electrical domain.

Figure 3:
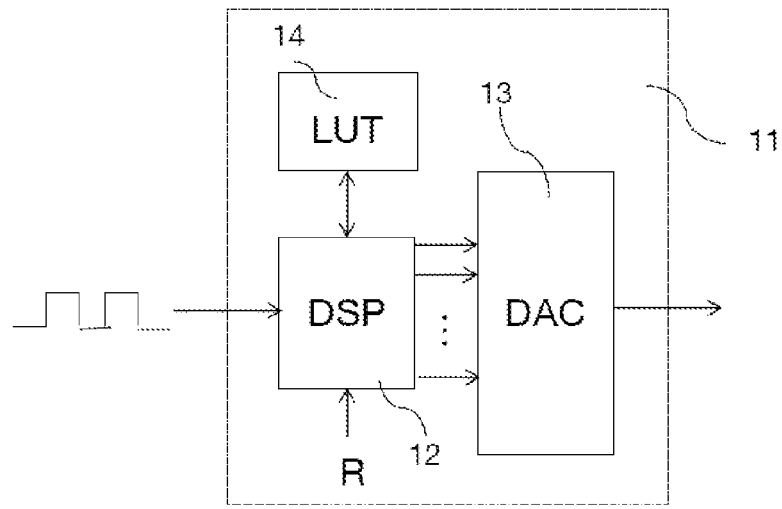
FIG. 3 illustrates a pre-distortion device according to an embodiment of the present disclosure.

Reference is now made to FIG. 3 which more particularly illustrates a pre-distortion device according to an embodiment of the present disclosure.

This pre-distortion device 11 comprises processing means 12, which typically consist of a processor, implemented for example in the form of a DSP module. These processing means 12 generate, from useful data received as input, a plurality of N sub-carriers in digital form and supplies these sub-carriers, in parallel, to a digital-analog converter 13, which converts them into an analog signal intended to be supplied to the electro-optical conversion means 15 of the optical transmitter 10.

These processing means 12 are arranged in particular to apply, to the amplitude of each ith electrical sub-carrier generated, a corrective factor $\alpha_{A,i}$, specific to this ith sub-carrier since the amplitude of the ith electrical sub-carrier is expressed in digital form, the corrective factor $\alpha_{A,i}$ is also expressed in digital form.

In other words, where an identical "nominal" transmission power $P_{S,SC}$ is normally used for the different electrical sub-carriers generated from an OFDM signal, the amplitude of each sub-carrier is multiplied here by the corrective factor $\alpha_{A,i}$ specifically corresponding to this sub-carrier in the processing means 12, so that the signal $S_E$ exhibits a distorted spectrum (i.e. not flat) at the output of the processing means 12.

On account of this, in the device 11, the processing means 12 can be associated with a read-only memory (not illustrated) forming a storage medium, that can be read by these processing means on which is stored a computer program according to an aspect of the present disclosure, comprising instructions for the execution of the steps of a pre-distortion method according to an aspect of the present disclosure, these steps being described later with reference to FIG. 4.

In addition to the abovementioned processing means 12, the device 11 advantageously comprises storage means 14, typically implemented in the form of a storage table (or "look-up table", LUT), capable of storing a certain number of corrective factors $\alpha_{A,i}$, that can be applied to the amplitude of the electrical sub-carriers by the processing means 12.

In particular, a single series of corrective factors can be stored therein, when these corrective factors are calculated from measurements performed specifically for the line 30 concerned.

Alternatively, several series of corrective factors corresponding to different possible transmission line configurations can be stored therein beforehand, in which case the processing means 12 access the storage means 14 to check therein as to whether there is a series of corrective factors $\alpha_{A,i}$, associated with a line configuration corresponding (exactly or largely) to the specific configuration of the line 30 and, if there is, recover these corrective factors $\alpha_{A,i}$, in order to apply them to the respective amplitudes of the electrical sub-carriers to which these factors correspond.

Figure 4:
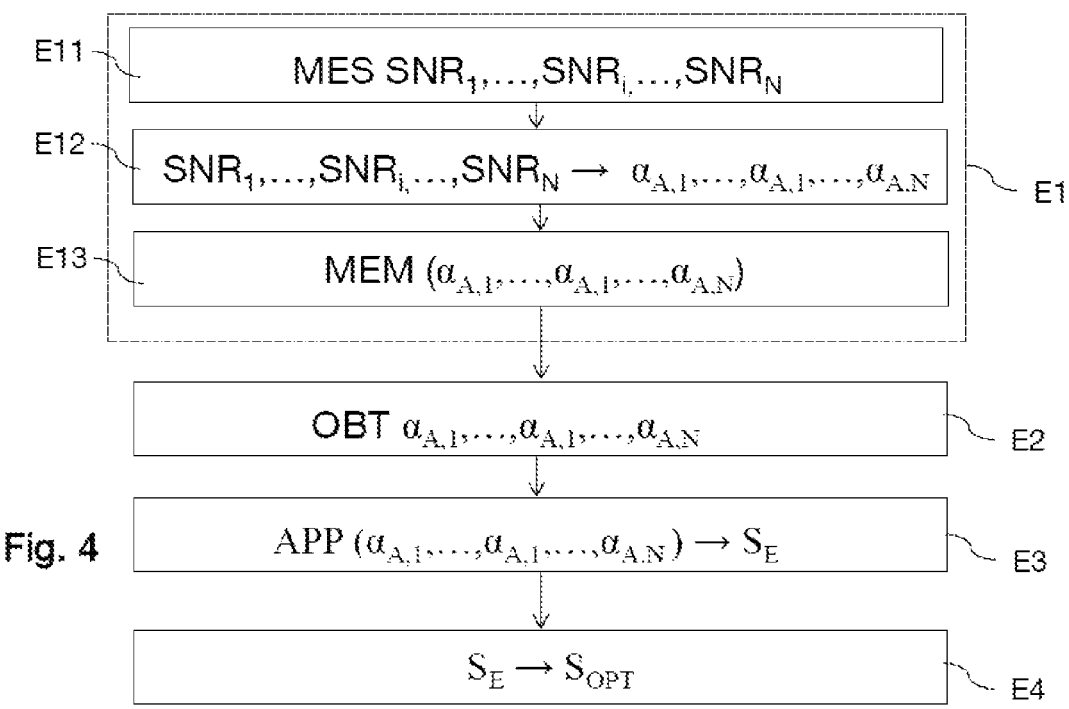
FIG. 4 illustrates a pre-distortion method according to an embodiment of the present disclosure.

Reference is now made to FIG. 4 which illustrates a pre-distortion method according to an embodiment of the present disclosure.

In this method, the pre-distortion device 11 is advantageously configured beforehand (step E1), in order to allow for a subsequent implementation of the actual pre-distortion when useful data are to be transmitted.

During this preliminary configuration step E1, a certain number of sets of N corrective factors $\alpha_{A,i}$, intended to be applied to the amplitude of the N electrical sub-carriers before optical conversion, are calculated so as to allow for the equalization, at the output of the optical transmission line 30, of the values $Q_1$ taken by a first parameter Q, dependent on the power of a signal, for the different multiplexed optical sub-carriers.

This first parameter Q is typically the signal-to-noise ratio (SNR), which reflects the impact of the spectral transfer functions of the optical devices both on the power of the optical signal and on that of the optical noise, in which case efforts are made to equalize the N signal-to-noise ratio values $SNR_i$ specific to the different sub-carriers of the signal $S_{OPT}$ at the line output 30, the equalization of these parameters making it possible to obtain a better bit error ratio.

In a simplified variant, if it is considered that the noise power is relatively uniform over all of the spectrum of the optical signal $S_{OPT}$, this first parameter Q is the optical power P, in which case efforts are made to equalize the N power values $P_i$ specific to the different sub-carriers of the signal $S_{OPT}$ at the line output 30.

As already indicated, a first variant preliminary configuration consists, for a given transmission line 30 at the input of which there is a pre-distortion device 11 already installed, in measuring (step E11) the N values of this first parameter Q for the different sub-carriers from an OFDM optical signal transmitted in this line 30, this signal being able to be a specific test signal, even a signal carrying useful data transmitted previously, and in calculating (step E12) each of the N corrective factors $\alpha_{A,i}$, from the N measured values of this first parameter Q. Once calculated, the corrective factors $\alpha_{A,i}$, can then be stored (step E13), so as to be able to be then directly applied by the processing means 12 in the generation in the electrical domain of the OFDM signal carrying useful data.

A single series of corrective factors can thus be stored, notably when the optical signals transmitted by the transmitter 10 follow the transmission line 30 to a single destination, and therefore passes through the same cascade of optical devices.

Alternatively, when the line 30, at the input of which the device 11 is installed, comprises multiple branches, and therefore the optical signals transmitted by the transmitter 10 can follow optical paths having different cascades of optical devices depending on the planned destination, it is possible to store several series of N corrective factors, evaluated for each possible destination of an optical signal transmitted by the transmitter 10 and following the line 30. In the latter case, when they have to generate an optical signal passing through the line 30 to a particular destination, the processing means 12 search the storage means for the corrective factors $\alpha_{A,i}$, associated with this specific destination.

A second variant preliminary configuration consists in determining several sets of corrective factors $\alpha_{A,i}$, corresponding to a certain number of possible transmission line configurations (these configurations being able to be identified by a value of a parameter R which is associated with them), and in storing, in the storage means 14, for each of these transmission line configurations, the duly determined sets of corrective factors, advantageously in association with the value of the parameter R characterizing the line configuration which is associated with them.

In this case, the preliminary configuration step E1 comprises, for a specific line configuration:
  the determination (step E11), at the output of the optical transmission line for which the configuration is considered, values of the first parameter Q for each of the optical sub-carriers of the signal $S_{OPT}$, typically following the transmission of a test OFDM optical signal in this line, by measuring the value $Q_i$ of this first parameter Q for each ith optical sub-carrier by means of an optical spectrum analyser;

the calculation (step E12) of the corrective factors $\alpha_{A,i}$, respectively associated with each of these optical sub-carriers from the values $Q_i$ determined for the first parameter Q; and the storage (step E13), in the storage means 14 of the pre-distortion device 11, of these corrective factors $\alpha_{A,i}$, advantageously in association with a specific parameter R value identifying this line configuration.

These operations are repeated a number M of times (M≥1) for different optical transmission line configurations.

This last variant makes it possible to preconfigure the pre-distortion device even before its installation in the transmitter 10 at the input of the transmission line 30 (e.g. in the factory), by storing therein a certain number of series of N corrective factors applicable for possible optical transmission line configurations.

The processing means 12 then simply have to select, from the stored sets of N corrective factors, the set associated with an optical transmission line configuration corresponding, either strictly identically, or in the closest possible approximation, to the specific configuration of the transmission line 30.

To illustrate this last case, it can be supposed that, in a first approximation, out of the different optical devices present on the transmission line considered, only the ROADM multiplexers present in this line are taken into account, these being considered to most affect the spectra of the optical signal $S_{OPT}$. In a second approximation, it can be considered that all these ROADM multiplexers have similar spectral transfer functions.

In such a case, different series of corrective factors can be calculated for optical lines having different numbers of ROADM multiplexers, and the parameter R characterizing the configuration of these optical lines can simply be the number of ROADM multiplexers present in these transmission lines.

The preliminary configuration step E1 then consists in proceeding to measure the values $Q_i$ of the first parameter Q on a first test transmission line containing only a single ROADM multiplexer (i.e. R=1) in order to obtain a first set of corrective factors $\alpha_{A,i,R=1}$, then to measure the values $Q_i$ of the first parameter Q with a test transmission line comprising two ROADM multiplexers (i.e. R=2) in order to obtain a second set of values of corrective factors $\alpha_{A,i,R=2}$, and so on, up to a sufficient number M of ROADM multiplexers to be able to cover all the possible optical transmission line configurations used in real useful data transmission conditions.

The different sets of corrective factor values $\alpha_{A,i}$, are thus stored, possibly in association with the parameter R value identifying the line configuration employed to calculate these values (in this case the number of ROADM multiplexers in the optical line), in the storage means 14, in order to be able to be recovered subsequently by the processing means 12, as in the exemplary table below:

| R | $\alpha_{A,1}$ | ... | $\alpha_{A,i}$ | ... | $\alpha_{A,N}$ |
|---|---|---|---|---|---|
| 1 | 1.05 | ... | 1 | ... | 1 |
| 2 | 1.1 | ... | 1.05 | ... | 1.02 |
| ... | ... | ... | ... | ... | ... |

More generally, an optical transmission line configuration can be characterized by the different quantities of L optical devices of distinct types present in this line (L≥1), in which each distinct type of device has a distinct spectral transfer function likely to affect the spectrum of the optical signal $S_{OPT}$. In this case, the storage means 14 first stores the series of corrective factors $\alpha_{A,i}$ calculated for line configurations corresponding to the different possible combinations of these different quantities of optical devices (the parameter R can then be a doublet, a triplet, etc., depending on the number L of distinct types of devices). This enables the processing means 12 to retrieve the corrective factors to be applied, in the transmission of the signal over the transmission line 30, after having obtained the information on the quantities of optical devices of different types that this line 30 contains.

Alternatively, these series of corrective factors $\alpha_{A,i}$ can be calculated for different line configurations corresponding to a specific type of optical device (e.g. ROADM) associated with a variable distance separating this optical device from the device preceding it in the line concerned.

The storage means 14 can be fed with series of corrective factors corresponding to all or some of the abovementioned variants, the processing means 12 then being able to recover several series of corrective factors that can be used for the line 30, according to different criteria, and to calculate the corrective factors $\alpha_{A,i}$ to be applied from these corrective factors (e.g. by averaging them).

Once the preliminary configuration of the pre-distortion device 11 has been performed, the pre-distortion can then be applied in a nominal operating mode of the optical transmitter 10, i.e. when the latter has to transmit OFDM signals carrying useful data.

In such a nominal operating mode, the processing means 12 access (step E2) the storage means 14 to recover the corrective factors $\alpha_{A,i}$ to be applied respectively to the electrical sub-carriers of the signal $S_E$ to be transmitted.

In the case where several sets of N corrective factors $\alpha_{A,i}$ are stored in the storage means 14, the processing means 12 select the set to be recovered that best corresponds to the configuration of the line 30 in which the signal $S_E$ is to be transmitted.

This can be done, for example, by retrieving, if it has been entered, a parameter R value identifying this configuration, for example when R identifies the destination of the data in a line 30 with branches or when R identifies the number of ROADM multiplexers in this line 30 and by recovering the N corrective factors $\alpha_{A,i}$ associated with this value in the storage means 14. In this case, the parameter R is obtained beforehand by the processing means 12, for example in the form of a piece of information supplied to the device 11 by the operator of the transmission line 30, or by automatic detection of this parameter.

Once provided with these N corrective factors $\alpha_{A,i}$, the processing means 12 apply (step E3) these factors to the respective amplitudes of the N corresponding electrical sub-carriers, in the generation of the sub-carriers in the electrical domain, before the thus distorted electrical signal $S_E$ is supplied to the digital-analog converter 13, the latter supplying the electrical signal, in analog form this time, to the electro-optical conversion means 15 for the latter to convert (step E4) the electrical signal into an optical signal $S_{OPT}$ transmitted to the line 30.

In one embodiment, the first parameter Q, the values of which are to be equalized for the different optical sub-carriers at the line output 30, is the signal-to-noise ratio SNR at the output of the optical transmission line, such that the corrective factors $\alpha_{A,i}$ serve to pre-distort the spectrum of the OFDM signal in transmission in order to make the particular signal-to-noise ratio values $SNR_i$ of the different OFDM sub-carriers uniform in reception.

The corrective factors $\alpha_{A,i}$ are then calculated as follows:

For the ith optical sub-carrier of the signal $S_{OPT}$, the signal-to-noise ratio $SNR_i$ is expressed as follows:

$$SNR_i = \frac{P_{SC,i}}{P_{n,i}}$$

in which:

$P_{SC,i}$ is the power of the ith optical sub-carrier of the signal $S_{OPT}$ at the output of the line 30.

$P_{n,i}$ is the power of the noise (mainly caused by the amplified spontaneous emission, called ASE, from the optical amplifiers) affecting this ith optical sub-carrier, at the output of this line 30.

It can be seen in this equation that both the power $P_{SC,i}$ of the ith optical sub-carrier and the noise power $P_{n,i}$ affecting it are likely to be impacted by the spectral transfer functions of the optical devices present on the line 30.

It is then possible to express (as power) the corrective factor $\alpha_{P,i}$ to be applied for the ith sub-carrier as a function of the signal-to-noise ratio $SNR_i$ for this sub-carrier:

$$\alpha_{P,i} = \frac{\beta}{SNR_i}$$

in which $\beta$ is a standardizing constant which can be defined as follows.

For the total power of the signal to be conserved in the application of the pre-distortion (to avoid having to modify the parameters of the "RF driver" electrical amplifier on each pre-distortion), a first condition to be met by the corrective factors is as follows:

$$\sum_{i=1}^{N} (\alpha_{P,i} \cdot P_{SCC,i}) = P_{SCC,total}$$

in which:

$P_{SSC,i}$ is the transmission power of the ith sub-carrier if no pre-distortion is applied;

$P_{SSC,total}$ is the total transmission power of all the sub-carriers if no pre-distortion is applied.

In as much as the transmission power $P_{SSC,1}$ is identical for all the sub-carriers in the absence of pre-distortion, this equation becomes:

$$P_{SCC,1} \cdot \sum_{i=1}^{N} \alpha_{P,i} = P_{SSC,total}$$

$$\sum_{i=1}^{N} \alpha_{P,i} = \sum_{i=1}^{N} \left(\frac{\beta}{SNR_i}\right) = N$$

hence the equation:

$$\beta = \frac{N}{\sum_{i=1}^{N}\left(\frac{1}{SNR_i}\right)}$$

and:
which makes it possible to obtain the corrective factor (in power) for the ith sub-carrier:

$$\alpha_{P,i} = \frac{1}{SNR_i} \cdot \frac{N}{\sum_{i=1}^{N}\left(\frac{1}{SNR_i}\right)}$$

The corrective factor $\alpha_{A,i}$ to be applied, expressed this time in amplitude, is then obtained as a function of the signal-to-noise ratios of the N sub-carriers of the optical signal $S_{OPT}$ at the receiver, according to the following equation (1):

$$\alpha_{A,i} = \sqrt{\alpha_{P,i}} = \sqrt{\frac{1}{SNR_i} \cdot \frac{N}{\sum_{i=1}^{N}\left(\frac{1}{SNR_i}\right)}} \quad (1)$$

To obtain these corrective factors $\alpha_{A,i}$ to be applied, it is therefore sufficient to first estimate the signal-to-noise ratio values $SNR_i$ of the N sub-carriers of the optical signal $S_{OPT}$ at the output of the transmission line 30 or of a transmission line of similar configuration.

In another embodiment in which the first parameter Q is the power of the signal, the corrective factors are calculated in order to substantially equalize the values of the optical powers $P_{SC,i}$ of the sub-carriers of the signal $S_{OPT}$ at the output of the optical transmission line 30. In particular, in the case where the spectral noise density of ASE, generated by the chain of optical amplifiers present on the equalization of this type of parameter gives good performance levels in terms of bit error ratio, while being simpler to implement than the equalization of the signal-to-noise ratios.

Given this last hypothesis, in order to conserve the total power of the signal in the application of the distortion, the parameter $SNR_i$ can be advantageously replaced, in the formula (1), by the ratio of the powers $$\frac{P_{SC,i}}{P_{SC,0}}$$

in which:
$P_{SC,0}$ is the power at the output of the optical transmission line 30 of a reference sub-carrier from among the sub-carriers of the optical signal;
$P_{SC,i}$ is the power at the output of the optical transmission line of the ith sub-carrier of the optical signal.

The reference sub-carrier is advantageously a sub-carrier situated at the centre of the spectrum of the optical signal $S_{OPT}$, in order to minimize the amplitude variations due to the pre-distortion for the sub-carriers situated at the edge of this spectrum.

Thus, for the ith sub-carrier, the corrective factor to be applied is then obtained by replacing, in the preceding equation (1), the parameters $SNR_i$ in the manner indicated above, in order to obtain the following equation (2):

$$\sqrt{\alpha_{P,i}} = \sqrt{\frac{P_{SC,0}}{P_{SC,i}} \cdot \frac{N}{\sum_{i=1}^{N}\left(\frac{P_{SC,0}}{P_{SC,i}}\right)}} \quad (2)$$

Obviously, the invention is not limited to the exemplary embodiments described above and represented, from which it will be possible to provide other embodiments and forms, without in any way departing from the framework of the invention.

The invention claimed is:

1. A method for pre-distorting an optical signal, intended to be transmitted over an optical transmission line having a configuration and comprising a plurality of frequency division multiplexed optical sub-carriers, said optical signal being obtained from optical conversion of an electrical signal comprising a plurality of frequency division multiplexed electrical sub-carriers, the method comprising:
   storing several sets of corrective factors in association with several possible optical transmission line configurations;
   recovering, from among the stored sets, a set of corrective factors for the respective electrical sub-carriers, which are associated with a configuration corresponding to the configuration of the optical transmission line, each of the corrective factors of the recovered set being a function of a first parameter that is dependent on the power of the respective sub-carrier; and
   applying the recovered set of corrective factors to amplitudes of the respective electrical sub-carriers, so as to equalize, at an output of said optical transmission line, values of the first parameter for the sub-carriers of the optical signal.

2. The method according to claim 1, further comprising a preliminary act of measuring the values of the first parameter at the output of the optical transmission line and calculating the corrective factors as a function of the measured values of the first parameter before being stored.

3. The method according to claim 1, in which the first parameter is the signal-to-noise ratio ($SNR_i$) of the respective optical sub-carrier.

4. The method according to claim 3, in which the corrective factor $\alpha_{A,i}$ corresponding to the ith sub-carrier of the electrical signal is calculated as follows:

$$\alpha_{A,i} = \sqrt{\frac{1}{SNR_i} \cdot \frac{N}{\sum_{i=1}^{N}\left(\frac{1}{SNR_i}\right)}}$$

in which $SNR_i$ is the signal-to-noise ratio of the ith optical sub-carrier at the output of the optical transmission line and N is the number of sub-carriers of the optical signal.

5. The method according to claim 1, in which the first parameter is the power of the respective optical sub-carrier.

6. The method according to claim 5, in which the corrective factor $\alpha_{A,i}$ corresponding to the ith sub-carrier of the electrical signal is calculated as follows:

$$\alpha_{A,i} = \sqrt{\frac{P_{SC,0}}{P_{SC,i}} \cdot \frac{N}{\sum_{i=1}^{N}\left(\frac{P_{SC,0}}{P_{SC,i}}\right)}}$$

in which $P_{SC,0}$ is the power at the output of the optical transmission line of a reference sub-carrier from among the sub-carriers of the optical signal, $P_{SC,i}$ is the power at the output of the optical transmission line of the ith sub-carrier of the optical signal and N is the number of sub-carriers of the optical signal.

7. A device for pre-distorting an electrical signal comprising a plurality of frequency division multiplexed sub-carriers, intended to be converted into an optical signal transmitted over an optical transmission line having a configuration and comprising a plurality of frequency division multiplexed optical sub-carriers, said device comprising a processor configured to:
  store several sets of corrective factors in association with several possible optical transmission line configurations;
  recovering, from among the stored sets, a set of corrective factors for the respective electrical sub-carriers, which are associated with a configuration corresponding to the configuration of the optical transmission line, each of the corrective factors being a function of a first parameter dependent on the power of the respective sub-carrier; and
  apply the recovered set of corrective factors to the amplitudes of the respective electrical sub-carriers, so as to equalize, at an output of said optical transmission line, values of the first parameter for the sub-carriers of the optical signal.

8. The device according to claim 7, further comprising storage means suitable for storing the several sets of corrective factors, the processor being arranged to access the storage means in order to recover the corrective factors to be applied to the respective amplitudes of the sub-carriers of the electrical signal.

9. A method for pre-distorting an optical signal, intended to be transmitted over an optical transmission line and comprising a plurality of frequency division multiplexed optical sub-carriers, said optical signal being obtained from optical conversion of an electrical signal comprising a plurality of frequency division multiplexed electrical sub-carriers, the method comprising:
  obtaining a set of corrective factors, each corrective factor corresponding to one of the electrical sub-carriers and being a function the power or the signal-to-noise ratio of the respective optical sub-carrier; and
  applying the set of corrective factors to amplitudes of the respective electrical sub-carriers, so as to equalize, at an output of said optical transmission line, the powers or the signal-to-noise ratios of the sub-carriers of the optical signal.

10. The method according to claim 9, in which the set of corrective factors are functions of the signal-to noise ratios of the respective optical sub-carriers, and the corrective factor $\alpha_{A,i}$ corresponding to the ith sub-carrier of the electrical signal is calculated as follows:

$$\alpha_{A,i} = \sqrt{\frac{1}{SNR_i} \cdot \frac{N}{\sum_{i=1}^{N}\left(\frac{1}{SNR_i}\right)}}$$

in which $SNR_i$ is the signal-to-noise ratio of the ith optical sub-carrier at the output of the optical transmission line and N is the number of sub-carriers of the optical signal.

11. The method according to claim 9, in which the set of corrective factors are functions of the powers of the respective optical sub-carriers, and the corrective factor $\alpha_{A,i}$ corresponding to the ith sub-carrier of the electrical signal is calculated as follows:

$$\alpha_{A,i} = \sqrt{\frac{P_{SC,0}}{P_{SC,i}} \cdot \frac{N}{\sum_{i=1}^{N}\left(\frac{P_{SC,0}}{P_{SC,i}}\right)}}$$

in which $P_{SC,0}$ is the power at the output of the optical transmission line of a reference sub-carrier from among the sub-carriers of the optical signal, $P_{SC,i}$ is the power at the output of the optical transmission line of the ith sub-carrier of the optical signal and N is the number of sub-carriers of the optical signal.

12. The method according to claim 9, further comprising a preliminary act of measuring the values of the powers or the signal-to-noise ratios of the sub-carriers of the optical signal at the output of the optical transmission line and calculating the corrective factors as a function of the measured values before being stored.

* * * * *